(12) United States Patent  (10) Patent No.: US 7,961,434 B1
Bennin et al.  (45) Date of Patent: Jun. 14, 2011

(54) DISK DRIVE HEAD SUSPENSION WITH LEAF SPRING GRAM LOADING

(75) Inventors: Jeffry S. Bennin, Hutchinson, MN (US); Richard G. Fiedler, Hutchinson, MN (US); John A. Theget, Hutchinson, MN (US); Michael R. Tiller, Waconia, MN (US); Allan D. Tokuda, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 936 days.

(21) Appl. No.: 11/901,988

(22) Filed: Sep. 20, 2007

(51) Int. Cl.
*G11B 5/48* (2006.01)

(52) U.S. Cl. .................................... 360/244.8

(58) Field of Classification Search .............. 360/244.8
See application file for complete search history.

(56) References Cited

U.S. PATENT DOCUMENTS

| | | | |
|---|---|---|---|
| 4,189,759 A | 2/1980 | Bauck et al. | |
| 4,901,176 A | 2/1990 | Kuzuhara | |
| 5,012,369 A | 4/1991 | Owe et al. | |
| 5,734,525 A | 3/1998 | Girard | |
| 5,796,554 A | 8/1998 | Berding et al. | |
| 6,437,948 B1 | 8/2002 | Sugimoto | |
| 6,721,133 B2 * | 4/2004 | Takagi et al. | 360/244.8 |
| 6,735,050 B2 * | 5/2004 | Takagi et al. | 360/244.9 |
| 6,778,362 B1 | 8/2004 | Davis et al. | |
| 6,934,125 B2 * | 8/2005 | Takagi et al. | 360/244.8 |
| 7,068,469 B2 | 6/2006 | Kuwajima et al. | |
| 7,076,859 B2 | 7/2006 | Danielson et al. | |
| 7,170,717 B2 | 1/2007 | Kuwajima et al. | |
| 7,265,944 B1 * | 9/2007 | Coon et al. | 360/244.8 |
| 7,304,823 B2 | 12/2007 | Suzuki | |
| 7,327,536 B2 | 2/2008 | Wada et al. | |
| 7,573,680 B1 * | 8/2009 | Kulangara | 360/244.8 |
| 7,636,221 B2 * | 12/2009 | Watadani et al. | 360/244.8 |
| 2001/0008475 A1 * | 7/2001 | Takagi et al. | 360/244.8 |
| 2002/0048121 A1 * | 4/2002 | Takagi et al. | 360/244.8 |
| 2002/0051319 A1 * | 5/2002 | Takagi et al. | 360/244.9 |
| 2006/0209463 A1 | 9/2006 | Watadani et al. | |
| 2007/0188926 A1 | 8/2007 | Kushima | |

FOREIGN PATENT DOCUMENTS

| | | |
|---|---|---|
| JP | 61273783 | 12/1986 |
| JP | 62248178 | 10/1987 |
| JP | 09082052 | 3/1997 |

* cited by examiner

*Primary Examiner* — David D Davis
(74) *Attorney, Agent, or Firm* — Faegre & Benson LLP

(57) ABSTRACT

A disk drive head suspension having a leaf-type gram load spring. One embodiment of the suspension includes a base plate and a load beam. The load beam is formed from a single piece of stainless steel and includes a mounting region, a beam region, a spring region between the mounting region and beam region, and a leaf spring extending from the beam region. The mounting region of the load beam is attached to the base plate, with a proximal end portion of the leaf spring overlaying the base plate. The leaf spring can have a formed bend in the z-height direction and is forced into a loaded state before the proximal end is welded to the base plate.

19 Claims, 5 Drawing Sheets

DISK DRIVE HEAD SUSPENSION WITH LEAF SPRING GRAM LOADING

FIELD OF THE INVENTION

The invention relates generally to disk drive head suspension components. In particular, the invention is a structure and method for gram loading a disk drive head suspension.

BACKGROUND OF THE INVENTION

Disk drive head suspensions are well known and disclosed, for example, in the Danielson et al. U.S. Pat. No. 7,076,859. Briefly, suspensions of this type include a relatively thin stainless steel load beam having a base or mounting region, a rigid beam region, and a spring or radius region extending between the mounting and beam regions. A baseplate is sometimes attached to the mounting region. The spring region is commonly radius formed by rolling the stainless steel around a mandrel so the beam region is offset from and extends at an angle with respect to the mounting region. This radius form in spring region provides a spring force known as the gram load when the suspension is in operation in a disk drive. Unfortunately, with increasing miniaturization of head suspensions and the fabrication of the suspensions from increasingly thinner stainless steel with lower spring rates, it becomes increasingly difficult to accurately radius form and gram load the spring region during the suspension manufacturing process. For similar reasons, these thinner springs are more susceptible to load loss during repeated load/unload cycles when operated in a disk drive. This load loss contributes to gram load instability.

There is, therefore, a continuing need for improved head suspensions and components. In particular, there is a need for suspensions and components fabricated from thin spring material that can be accurately gram loaded. The gram load should be stable over time during operation of the suspensions in disk drives. To be commercially viable, the suspensions should be capable of being efficiently manufactured.

SUMMARY OF THE INVENTION

The invention is a disk drive head suspension having a leaf-type gram load spring that can be accurately and stably gram loaded. One embodiment of the head suspension includes a base region, a beam region, a spring region connecting the beam region to the base region and a leaf spring extending between the beam region and the base region. The leaf spring is fixedly connected to the beam region and base region, and applies a gram load force to the beam region with respect to the base region. In other embodiments of the suspension the base region includes a base plate and the beam region, spring region and leaf spring are portions of a load beam formed from one piece of spring metal.

DETAILED DESCRIPTION OF THE PREFERRED EMBODIMENTS

Figure 1:
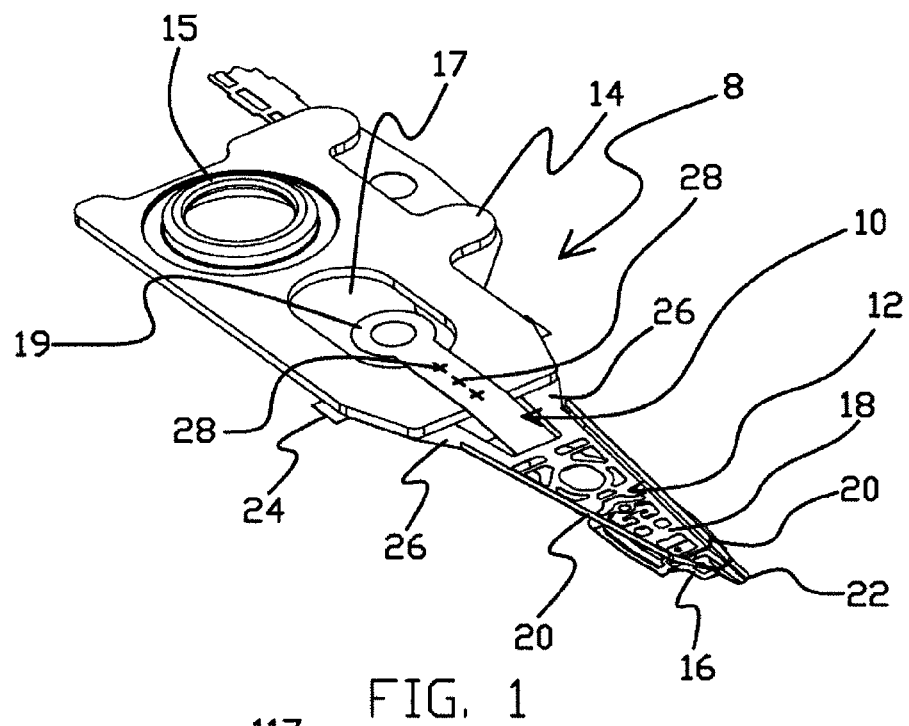
FIG. 1 is an isometric view of a suspension having a leaf gram load spring in accordance with one embodiment of the invention.

FIG. 1 is an illustration of a head suspension 8 having a leaf gram load spring 10 in accordance with one embodiment of the invention. Leaf spring 10 is an integral member of the load beam 12 in the illustrated embodiment. Head suspension 8 has a base region that includes a mounting or base member such as base plate 14 in the illustrated embodiment, and a wireless or integrated lead flexure 16. Flexure 16 can be of any conventional or otherwise known design, and is attached to the load beam 12 by welds or other attachment structures. In addition to the leaf spring 10, load beam 12 includes a rigid beam region 18 having stiffening rails 20 on its opposite sides, a headlift 22 on its distal end, a mounting region 24 that is welded or otherwise attached to the base plate 14 (the welds are not visible in FIG. 1), and a resilient hinge or spring region formed by a pair of transversely spaced spring arms 26 extending between the mounting region and the beam region. Other embodiments of the invention do not include headlift 22. With the exception of leaf spring 10 and the spring arms 26 as described below, load beam 12 can be of any conventional or otherwise known design. Although the load beam 12 is a one-piece member formed from a single piece of spring metal such as stainless steel in the illustrated embodiment, other embodiments are formed from separate components such as a beam and hinge that are welded or otherwise joined together. The illustrated embodiment of base plate 14 has a boss tower 15 and aperture 17. With the exception of aperture 17, base plate 14 can be of any conventional or otherwise known design. In still other embodiments of the invention (not shown) the base member is an integral arm or other structure that can be welded or otherwise attached to the mounting region 24 or the spring region.

Spring arms 26 are generally planar members, and in the illustrated embodiment are not radius formed. Other embodiments of the invention (not shown) have formed spring arms. The leaf spring 10 is a relatively thin, elongated member that extends from the beam region 18 of load beam 12 to a distal portion of the base plate 14. The leaf spring 10 is centered on the longitudinal axis of the load beam 12, and extends between the spring arms 26 in the illustrated embodiment. The leaf spring 10 extends over the side of the base plate 14 opposite the side of the base plate that the mounting region 24 is attached to, causing the leaf spring to be deflected in the z-height direction with respect to the major surfaces of the spring arms 26 and the beam region 18. The portion of the leaf spring 10 extending over the base plate 14 is fixedly attached to the base plate. A proximal end portion of the leaf spring 10 includes an engagement structure 19 located over the aperture 17 in the base plate 14. In the illustrated embodiment, one or more welds 28 attach the leaf spring 10 to the base plate 14, although other attachment structures or approaches (e.g., adhesives or rivet-type structures) can be used in other embodiments (not shown).

Spring arms 26 function as a hinge or pivot location at which the beam region 18 can move with respect to the base plate 14. However, unlike load beams having a radius form, the spring arms 26 of load beam 12 do not provide substantial portions of the gram load. Although the spring arms 26 will inherently provide some relatively small bias force against movement of the beam region 18 from its neutral or unloaded state, leaf spring 10 functions to provide all or at least a substantial portion of the gram load to the suspension 8.

In the illustrated embodiment of the invention, the portion of the leaf spring 10 between the welds 28 and beam region 18 can be in a compressed loaded state when the beam region and spring arms 26 are in a generally planar position with respect to one another and the base plate 14. This load on the leaf spring 10 can cause the leaf spring to take a curved or buckled shape when the beam region 18 and spring arms 26 are in the planar position with respect to the base plate 14. In this embodiment of the invention, the load on the leaf spring 10 will bias the beam region 18 of the load beam 12 to an angularly deflected position with respect to the base plate 14 when the beam region is in its neutral state (i.e., when no external load is applied to the beam region with respect to the base plate). When incorporated into and operated in a disk drive (not shown), the aerodynamic lift force generated by a slider (not shown) on the flexure 16 in cooperation with the air bearing of a spinning disk will act against the gram load force of the leaf spring 10, much as the aerodynamic force operates against the gram load provided by the spring region radius form in conventional load beams. In other embodiments of the invention, the leaf spring 10 is in an unloaded state when the beam region 18 and spring arms 26 are in the planar position with respect to the base plate 14. In this embodiment the beam region 18 and spring arms 26 will be in a generally planar position with respect to the base plate 14 when the beam region is in its neutral state with respect to the base plate.

Figure 3:
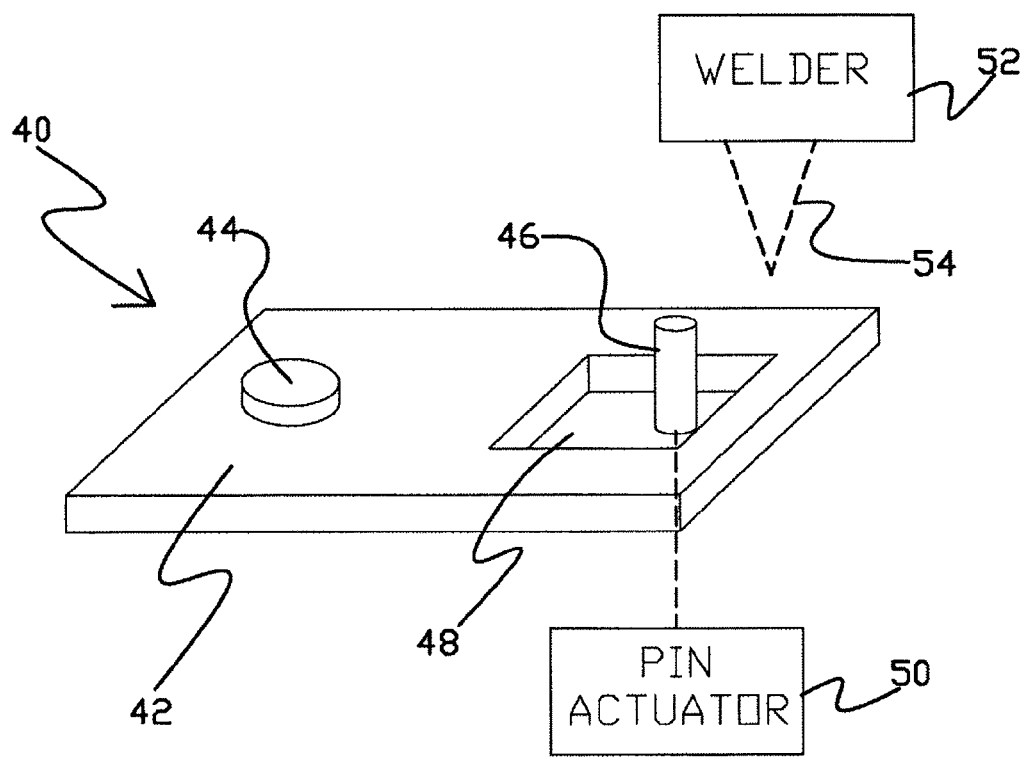
FIG. 3 is an illustration of a fixture and related manufacturing equipment that can be used to set the gram load of suspensions such as that shown in FIGS. 1 and 2.

Load beam 12 can be manufactured from sheets of stainless steel stock using conventional or otherwise known methods such as photolithography, etching and mechanical forming processes. The mounting region 24 of the load beam 12 can be attached to the base plate 14 using conventional or otherwise known methods such as welding. FIG. 3 is an illustration of a fixture 40 that can be used to load the leaf spring 10 after the load beam 12 is attached to the base plate 14. As shown, fixture 40 includes a surface 42 for receiving the base plate 14 and load beam 12. The fixture 40 can include registration structures such as a boss tower engaging protuberance 44 for locating the base plate 14 and/or load beam 12. A leaf spring engaging structure such as pin 46 extends through an aperture 48 in the fixture 40, and is located so that it will extend through the aperture 17 in a base plate 14 positioned on the fixture and engage (e.g., extend through) the engagement structure 19 on the leaf spring 10. An actuation mechanism 50 coupled to the pin 46 controllably drives the pin in a direction (e.g., generally parallel to the base plate 14 in the illustrated embodiment) that applies the desired compressive load to the leaf spring 10. While the desired load is applied in this manner, a welder 52 can be actuated (e.g., to generate a laser beam 54) to form welds 28 (FIG. 1) and attach the leaf spring 10 to the base plate 14 in the loaded state.

In alternative embodiments, the leaf spring 10 is formed so as to be out of the plane (i.e., in the z-axis) of the base region structure to which it is to be attached (e.g., base plate 14 or mounting region 24). To load the suspension, the leaf spring 10 is forced into engagement with the base region and welded or otherwise attached. In addition to being formed out of the plane of the base region, the leaf spring 10 can be formed to have other bend structures (e.g., an arch) that enhance its spring characteristics. Tooling for moving the leaf spring 10 in a direction generally parallel to the head suspension 8 may not be needed during the manufacture of this embodiment of the invention.

Figure 2:
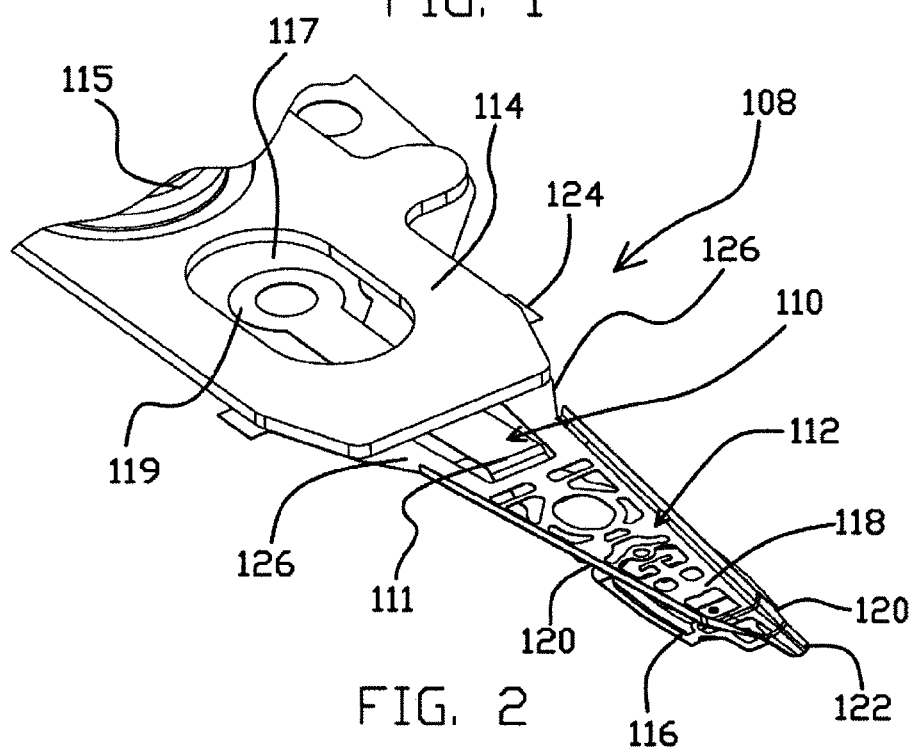
FIG. 2 is an isometric view of a suspension having a leaf gram load spring in accordance with an alternative embodiment of the invention.

FIG. 2 is an illustration of a head suspension 108 having a leaf gram load spring 110 in accordance with a second embodiment of the invention. With the exception of the leaf spring 110 as described below, head suspension 108 can be substantially the same as or similar to head suspension 8 described above, and similar features are identified by similar reference numbers. Head suspension 108 can also be manufactured and gram loaded using processes and equipment (such as fixture 40) that are substantially the same as or similar to those described above in connection with head suspension 108.

As shown in FIG. 2, leaf spring 110 is attached to the same side of the base plate 114 as the mounting region 124 of the load beam 112. Welds for attaching the leaf spring 110 to the base plate 114 are not visible in FIG. 2. The leaf spring 110 includes a bend 111 causing portions of the leaf spring to extend in the z-height direction out of the plane of the major surface of the beam region 118 and spring arms 126. The bend 111 facilitates the gram load force applied to the beam region 118 by the leaf spring 110. Although a relatively simple bend 111 is shown in the FIG. 2 embodiment, other bend configurations (e.g., S-shaped or other multiple bend shapes) can also be used. Bends such as 111 and the alternatives described herein can also be incorporated into other embodiments of the invention such as that described in connection with FIG. 1.

Figure 4:
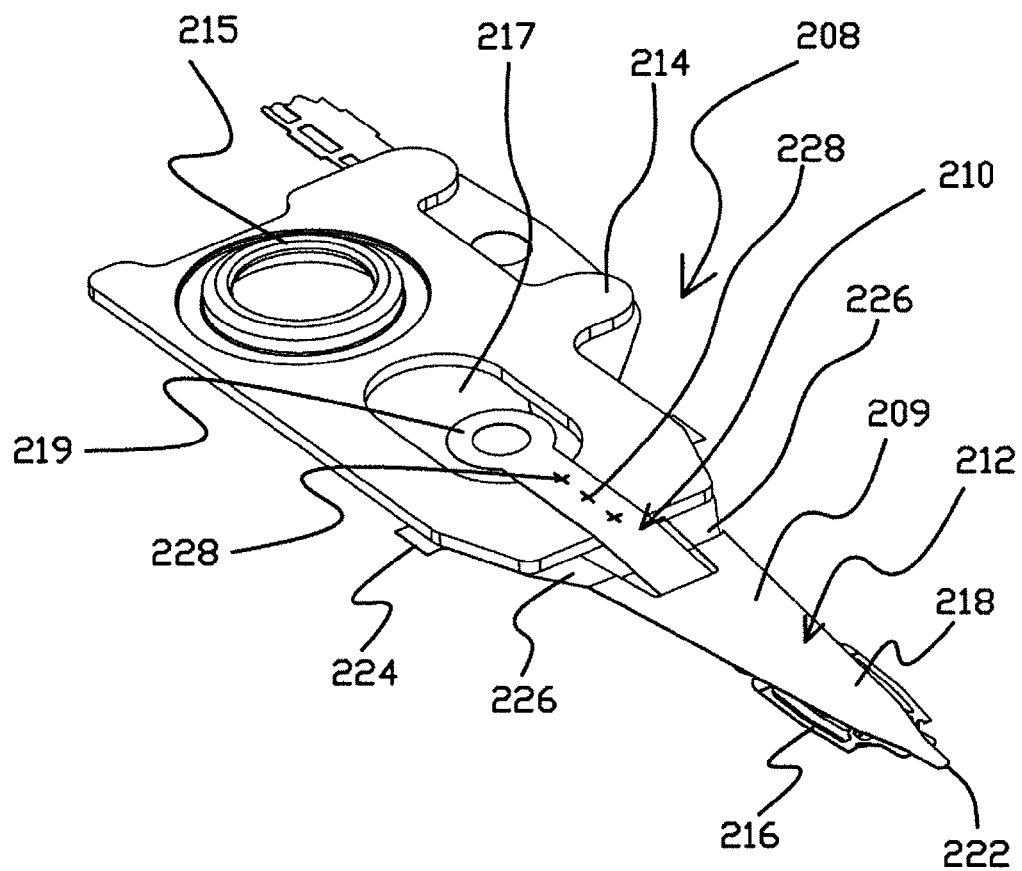
FIG. 4 is an isometric illustration of a suspension having a leaf gram load spring in accordance with yet another embodiment of the invention.

FIG. 4 is an illustration of a head suspension 208 having a leaf gram load spring 210 in accordance with another embodiment of the invention. Unlike the head suspension 8 described above in connection with FIG. 1, load beam 212 of suspension 208 does not include stiffening rails. Instead, load beam 212 includes a stainless steel or other stiffening member 209 that is welded or otherwise attached to the distal end of the leaf spring 210 and spring arms 226. In one embodiment of the invention, the mounting region 224, spring arms 226 and leaf spring 210 can be formed as a separate component having a distal end that overlays and is welded to the proximal end of the stiffening member 209. In other embodiments, the component including the mounting region 224, spring arms 226 and leaf spring 210 can overlay all or other portions of the stiffening member 209. Other than the differences described herein, head suspension 208 can be substantially the same as or similar to head suspension 8 described above in connection with FIG. 1, and similar features are identified by similar reference numbers.

Figure 5:
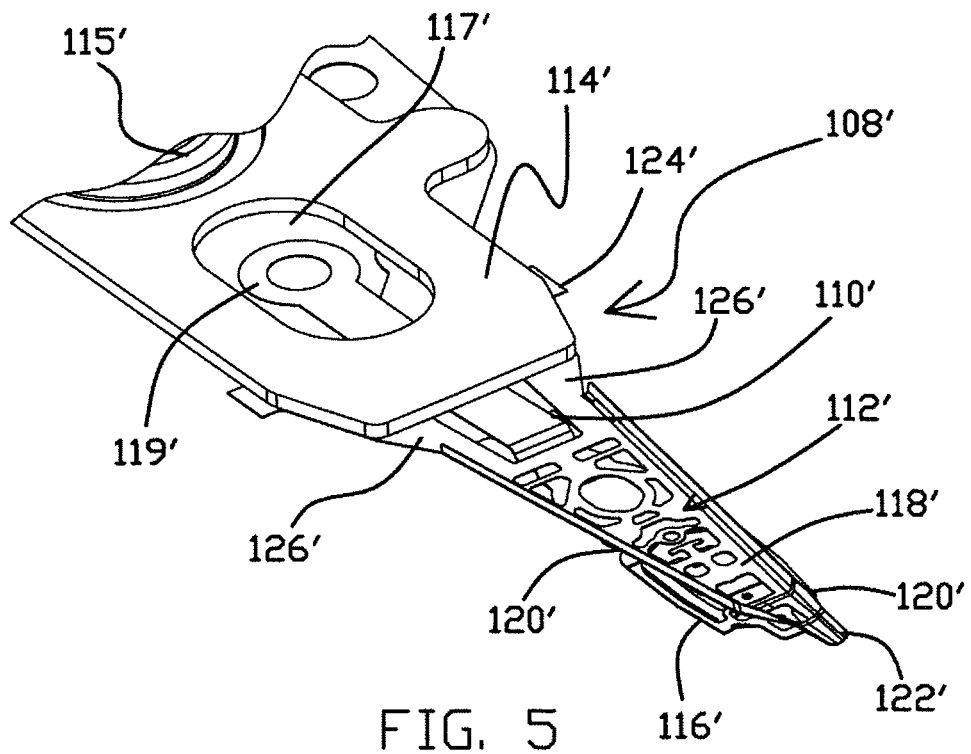
FIG. 5 is an isometric illustration of a suspension having a leaf gram load spring in accordance with another embodiment of the invention.

FIG. 5 is an illustration of a head suspension 108' having a leaf gram load spring 110' in accordance with another embodiment of the invention. With the exception of leaf spring 110' and the method for loading the head suspension 108', as described below, the head suspension can be substantially the same as or similar to head suspension 108 described above, and similar features are identified by similar reference numbers. Head suspension 108' can also be manufactured and gram loaded using processes and equipment that are substantially the same as or similar to those described above in connection with head suspension 108.

As shown, leaf spring 110' does not include a bend (e.g., bend 111 in the embodiment in FIG. 2) produced by rolling or other mechanical forming processes during manufacture. The effective length of spring 110' is therefore shorter than the length of spring arms 126, and the leaf spring will buckle or bow when forced into a loaded state. Since spring 110' is not subjected to plastic deformation forming steps during manufacture, stresses that can contribute to spring rate instability and load loss are not induced into the spring during manufacture. The head suspension 108' can therefore have enhanced gram load stability.

The invention offers a number of important advantages. The reduction or elimination of the radius form in the spring region results in enhanced resonance frequency performance of the suspension. Since forming need not be done after assembly, the stiffening rails can extend closer to the base plate, also enhancing the resonance performance of the suspension. Since the gram load force is applied substantially by the leaf spring, issues relating to low spring rate and load loss associated with the relatively thin spring metal in the spring region can be alleviated. The suspension can therefore be gram loaded to the requisite degree of accuracy, and maintain stability during operation in a disk drive. The suspension can also be efficiently manufactured.

The leaf spring can be designed so that in at least some embodiments the load beam remains in the elastic region throughout service, thereby limiting load loss from excess z-axis offset or creep. At least some embodiments of the invention can have leaf springs sized and attached to the mounting region in such a manner that the leaf spring buckles when loaded, resulting in a non linear force-deflection curve. In these embodiments the spring rate around the offset position can be designed to be relatively low while maintaining gram load. A lower spring rate can provide lower gram load variation with respect to offset and lift tab friction force.

Figure 6:
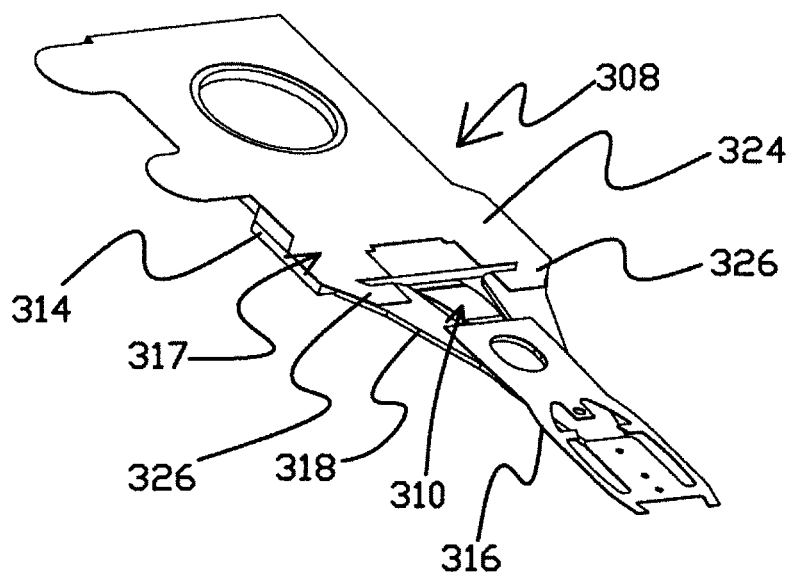
FIG. 6 is an isometric illustration of a suspension having a leaf gram load spring in accordance with another embodiment of the invention.

FIG. 6 is an illustration of a four-piece head suspension 308 having a leaf gram load spring 310 in accordance with another embodiment of the invention. As shown, the leaf spring 310 is formed integrally with and extends from the proximal end of flexure 316. In addition to flexure 316, head suspension 308 includes a base plate 314 having first and second opposite sides, hinge 317 and beam 318. Hinge 317 includes a mounting region 324 that is attached to the first side of base plate 314 and a pair of spring arms 326. The proximal end of beam 318 is attached to the distal ends of spring arms 326. Flexure 316 is attached to the beam 318. In the illustrated embodiment the proximal portion of leaf spring 310 is attached to the second side of the base plate 314 generally opposite the flexure 316. In other embodiments (not shown) the proximal portion of leaf spring 310 is attached to the first side of the base plate 314 (or to the mounting region of hinge 317). The leaf spring 310 can be formed to include z-height offset bends prior to being attached to the base plate 314, or can be unformed prior to attachment. Suspension 308 and leaf spring 310 can be loaded using any of the methods described above in connection with other embodiments of the invention.

Figure 7A:
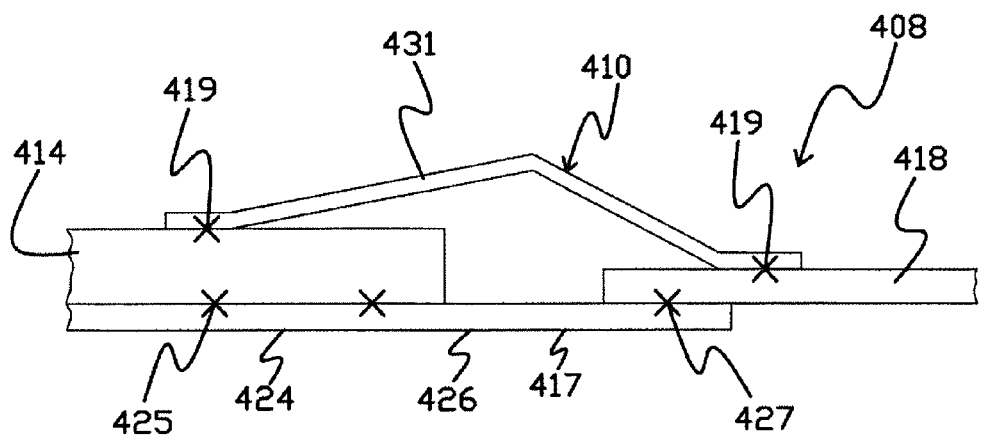
FIGS. 7A and 7B are side views of a portion of a suspension having a leaf gram load spring in accordance with another embodiment of the invention.
Figure 7B:
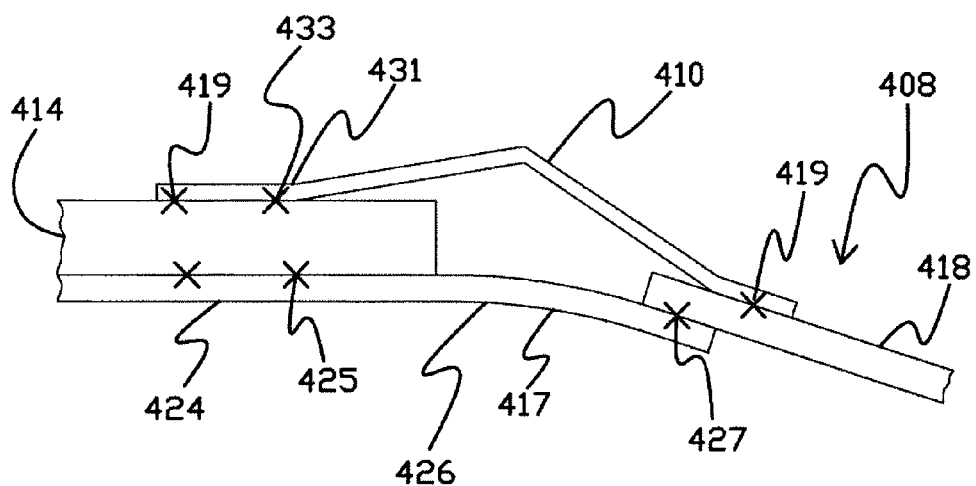

FIGS. 7A and 7B are side views of a portion of a suspension 408 having a leaf gram load spring 410 in accordance with another embodiment of the invention. In addition to leaf spring 410, suspension 408 includes base plate 414, hinge 417 and beam 418. A flexure (not shown) can be attached to the beam 418. Hinge 417 includes a mounting region 424 that is attached to the first side of base plate 414 (e.g., by welds 425 in the illustrated embodiment) and one or more spring arms 426 (only one spring arm is visible in FIGS. 7A and 7B). The proximal end of beam 418 is attached to the distal ends of spring arms 426 (e.g., by welds 427 in the illustrated embodiment). As shown, the leaf spring 410 is manufactured as a separate component in this embodiment of the invention, and has its opposite ends attached to the base plate 414 and the beam 418 by welds 419. Suspension 408 can be loaded after the leaf spring 410 is attached to the base plate 414 and the beam 418. In the unloaded state shown in FIG. 7A, the leaf spring 410 has free portions such as 431 that are spaced from the base plate 414 and/or beam 418 following the assembly of the leaf spring 410 onto the base plate and beam. To load the suspension 408, a loading force is applied to move the base plate 414 and beam 418 to an offset position with respect to one another, either directly or by applying a force between one or both of these components and the leaf spring 410, and at least one of the free portions 431 of the leaf spring is attached to the base plate and/or beam. In the embodiment shown in FIG. 7B, a free portion 431 of the leaf spring 410 adjacent to the base plate 414 is attached to the base plate by welds 433. In other embodiments of the invention (not shown), free portions of the leaf spring 410 adjacent to the beam 418 are fixedly attached to the beam in addition to or as an alternative to the attachment to the base plate 414. Although the suspension 408 is gram loaded after the leaf spring 410 has been initially attached to the suspension on opposite sides of the spring arms 426, the process described above effectively results in a shortening of the effective length of the leaf spring 410 to provide the gram load.

Although the invention has been described with reference to preferred embodiments, those skilled in the art will recognize that changes can be made in form and detail without departing from the spirit and scope of the invention. In particular, although the illustrated embodiments show a leaf gram load spring that is integrally formed from the same material as the spring arms and/or the beam region of the load beam, or the flexure, in other embodiments the leaf spring can be formed as a separate element that has a distal end portion separately attached (e.g., by welding) to the beam region of the suspension. Furthermore, although the loading of the leaf spring is done by applying a force from the end adjacent to the base plate and attaching the leaf spring to the base plate, in other embodiments the loading is done from the end of the leaf spring adjacent to the beam region and the distal end of the leaf spring is then attached to the beam region. The leaf spring can be attached to the base plate, load beam mounting region, integrated arm, or other structures located proximal of the suspension spring region. In still other embodiments of the invention the base plate, arm, or load beam are formed from laminated or clad stock having two or more metal layers separated by polymer layers, with the leaf spring formed from one of the layers.

What is claimed is:

1. A disk drive head suspension, including:

a base region;

a beam region;

a hinge region connecting the beam region to the base region; and a leaf spring extending between and fixedly connected to the beam region and the base region to apply a gram load force to the beam region with respect to the base region wherein the leaf spring provides substantially all of the gram load force to the suspension and the hinge region provides substantially no gram load force to the suspension.

2. The head suspension of claim 1 wherein:

the suspension further includes a mounting member having a first side opposite a second side;

the spring region is connected to the first side of the mounting member; and the leaf spring is connected to the first side of the mounting member.

3. The head suspension of claim 2 wherein the leaf spring includes one or more z-height offset bends between the mounting member and the beam region.

4. The head suspension of claim 1 wherein:
the suspension further includes a mounting member having a first side opposite a second side;
the spring region is connected to the first side of the mounting member; and
the leaf spring is connected to the second side of the mounting member.

5. The head suspension of claim 4 wherein the leaf spring includes one or more z-height offset bends between the mounting member and the beam region.

6. The head suspension of claim 1 wherein:
the beam region has a first side opposite a second side, and
the leaf spring is formed as a separate component from the beam region, and is attached to the first side of the beam region.

7. The head suspension of claim 1 wherein:
the beam region has a first side opposite a second side, and
the leaf spring is formed as a separate component from the beam region, and is attached to the second side of the beam region.

8. The head suspension of claim 1 wherein the leaf spring is integrally formed from the same material as the beam region.

9. The head suspension of claim 1 wherein the leaf spring is integrally formed from the same material as the spring region.

10. The head suspension of claim 1 wherein the leaf spring is integrally formed from the same material as the base region.

11. The head suspension of claim 1 wherein the suspension further includes a flexure mounted to the beam region and the leaf spring is integrally formed from the same material as the flexure.

12. A method for manufacturing a disk drive head suspension, including:
providing a head suspension including:
a base region;
a beam region;
a hinge region connecting the beam region to the base region; and
a leaf spring extending between the base region and the beam region, attached to the base region and/or the beam region and having an unattached free portion;
applying a loading force to the head suspension;
causing the free portion of the leaf spring to be fixedly attached to at least one of the base region and the beam region when the loading force is applied to the head suspension; and
removing the loading force after the free portion of the leaf spring is attached to the base region and/or the beam region.

13. The method of claim 12 wherein:
providing a head suspension member includes providing a leaf spring integrally formed from the same material as the beam region and having a proximal end portion extending to the base region; and
applying a loading force includes applying a loading force to the proximal end portion of the leaf spring; and
causing the leaf spring to be attached to the base region and/or the beam region includes attaching the proximal end portion of the leaf spring to the base region.

14. The method of claim 12 wherein attaching the leaf spring includes attaching the leaf spring to a base plate.

15. The method of claim 12 wherein:
providing a head suspension includes providing a flexure attached to the beam region, the flexure including a leaf spring integrally formed from the same material as the flexure and having a proximal end portion extending to the base region;
applying a loading force includes applying a loading force to the proximal end portion of the leaf spring; and
causing the leaf spring to be attached to the base region and the beam region includes attaching the proximal end portion of the leaf spring to the base region.

16. The method of claim 12 wherein applying a loading force includes applying a force to the leaf spring in a direction generally parallel to the base region.

17. The method of claim 12 wherein applying a loading force includes applying a force to the leaf spring in a direction generally perpendicular to the base region.

18. The method of claim 12 and further including allowing motion between the beam region and the mounting region when applying a loading force.

19. The method of claim 12 and further including fixedly holding and preventing motion between the beam region and the mounting region when applying a loading force.

* * * * *